US012782680B2

(12) United States Patent
Wang et al.

(10) Patent No.: US 12,782,680 B2
(45) Date of Patent: Nov. 3, 2026

(54) COMPOUND LENS

(71) Applicant: OMNIVISION TECHNOLOGIES, INC., Santa Clara, CA (US)

(72) Inventors: Kuang Ju Wang, Hsinchu City (TW); I Lung Lu, Hsinchu City (TW); Jau Jan Deng, Hsinchu City (TW)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 174 days.

(21) Appl. No.: 19/006,062

(22) Filed: Dec. 30, 2024

(65) Prior Publication Data

US 2026/0186244 A1 Jul. 2, 2026

(51) Int. Cl.
*G02B 9/62* (2006.01)

(52) U.S. Cl.
CPC .................................... *G02B 9/62* (2013.01)

(58) Field of Classification Search
CPC ........................................................ G02B 9/62
USPC ........................................................ 359/761
See application file for complete search history.

(56) References Cited

U.S. PATENT DOCUMENTS

2014/0334016 A1* 11/2014 Yin .................... G02B 13/0045
359/716

* cited by examiner

*Primary Examiner* — William Choi
(74) *Attorney, Agent, or Firm* — JCIPRNET

(57) ABSTRACT

A compound lens includes six coaxially aligned lenses: (i) a first substrate, and a first lens and, in order of increasing distance therefrom, and on a same side thereof, (ii) a second lens, a second substrate, a third lens, a third substrate, a fourth lens, a fifth lens, a fourth substrate and a sixth lens. The first lens and the fifth lens are negative lenses. The second lens and the fourth lens are positive lenses.

18 Claims, 14 Drawing Sheets

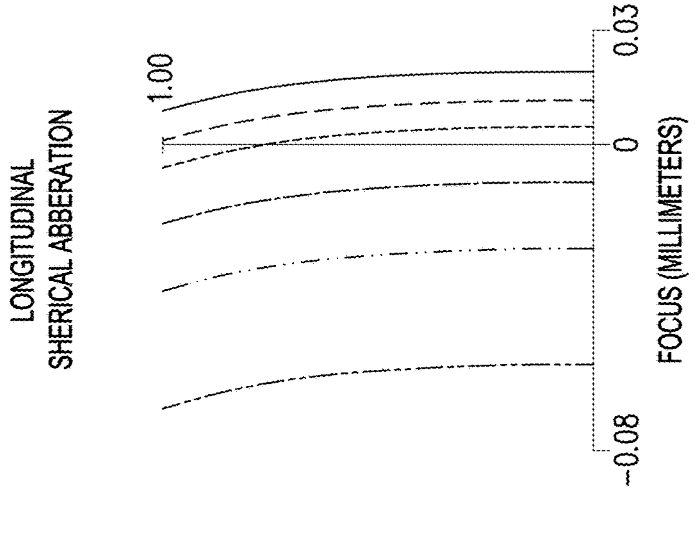
FIG. 3A
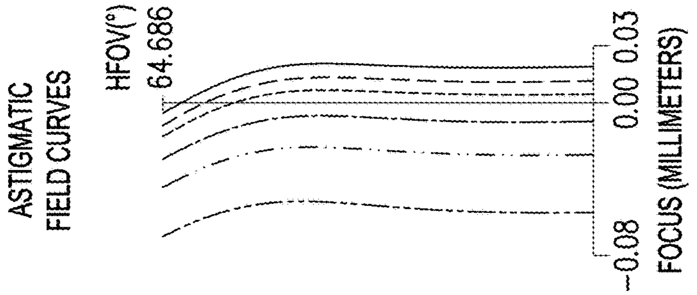
FIG. 3B
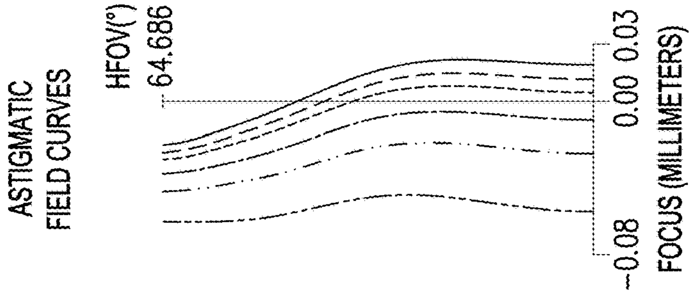
FIG. 3C
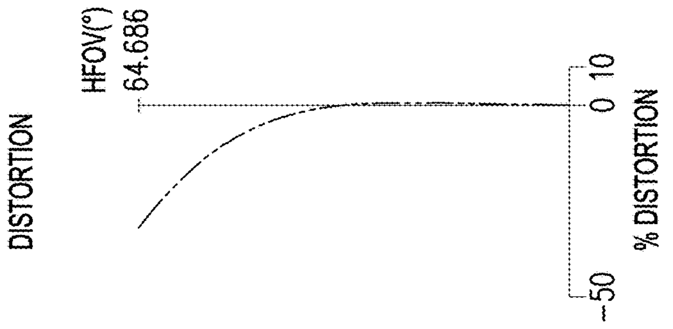
FIG. 3D
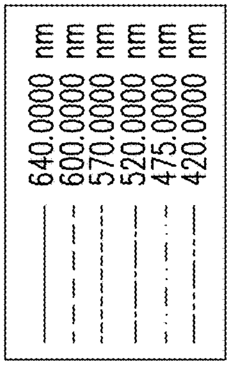

COMPOUND LENS

BACKGROUND

Technical Field

The disclosure relates to a compound lens.

Description of Related Art

Medical endoscopy, machine vision, eye/face tracking, and other applications require a compact camera that is able to capture a quality image with a wide field-of-view, and is manufacturable via a low-cost process compatible with high-volume manufacturing.

A four lens optical system is designed for improving image quality of three lens optical system and providing smaller lens size. Typically, the three lens optical system could provide camera with resolution of 400 pixels×400 pixels, pixel size of 1~1.75 μm, and field of view (FOV) of 90~120 degrees. Moreover, the four lens optical system could provide camera with resolution of 1000 pixels×1000 pixels, pixel size of 1~2.2 μm, and FOV of 120 degrees. However, if camera with higher sensor resolution and ultra-wide FOV are needed, a powerful lens system with more lens surfaces may be necessary to decrease the transverse ray aberration to get a good image quality. For example, a target lens optical system could provide camera with resolution of 1400 pixels×1400 pixels and FOV larger than 130 degrees.

SUMMARY

The disclosure is directed to a compound lens, which could provide higher sensor resolution and ultra-wide FOV.

A compound lens includes six coaxially aligned lenses: (i) a first substrate, and a first lens and, in order of increasing distance therefrom, and on a same side thereof, (ii) a second lens, a second substrate, a third lens, a third substrate, a fourth lens, a fifth lens, a fourth substrate and a sixth lens. The first lens and the fifth lens are negative lenses. The second lens and the fourth lens are positive lenses.

In view of the above, the compound lens in the embodiment includes a first lens, a second lens, a third lens, a fourth lens, a fifth lens and a sixth lens and the refractive powers of lenses are designed as: the first lens and the fifth lens are negative lenses, and the second lens and the fourth lens are positive lenses. Thus, comparing to the four lens optical system or the three lens optical system, the compound lens in the embodiment could provide good imaging quality, higher sensor resolution and ultra-wide FOV.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3A to 3D are diagrams of the longitudinal spherical aberration and various aberrations of the compound lens according to the first embodiment in FIG. 2A.

DESCRIPTION OF THE EMBODIMENTS

Figure 1:
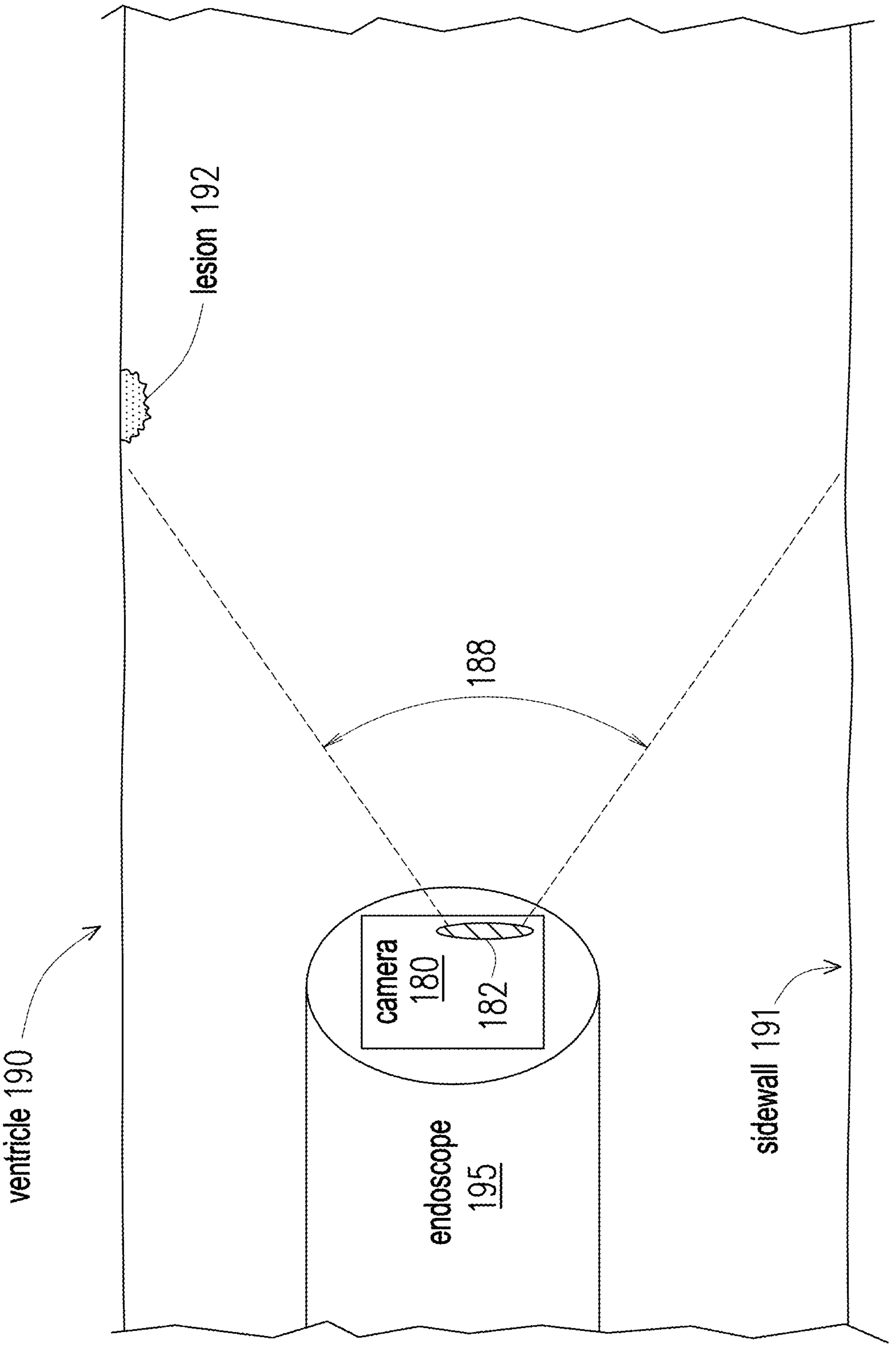
FIG. 1 is a cross-sectional view of a ventricle that includes a lesion imaged by an endoscope camera that includes a compound lens, in an embodiment.

FIG. 1 is a cross-sectional view of a ventricle that includes a lesion imaged by an endoscope camera that includes a compound lens, in an embodiment. Referring to FIG. 1, FIG. 1 shows an endoscope 195 is inside a ventricle 190 that includes a lesion 192. The lesion 192 is on a ventricle sidewall 191. The ventricle 190 may be, for example, a portion of an esophagus or an intestine. The endoscope 195 includes a camera 180, which images lesion 192. The camera 180 includes a lens 182, which in part determines a field of view 188 of camera 180. Without departing from the scope hereof, camera 180 may be part of a device other than an endoscope, such as a security camera, mobile device, or other consumer electronics product.

Figure 2A:
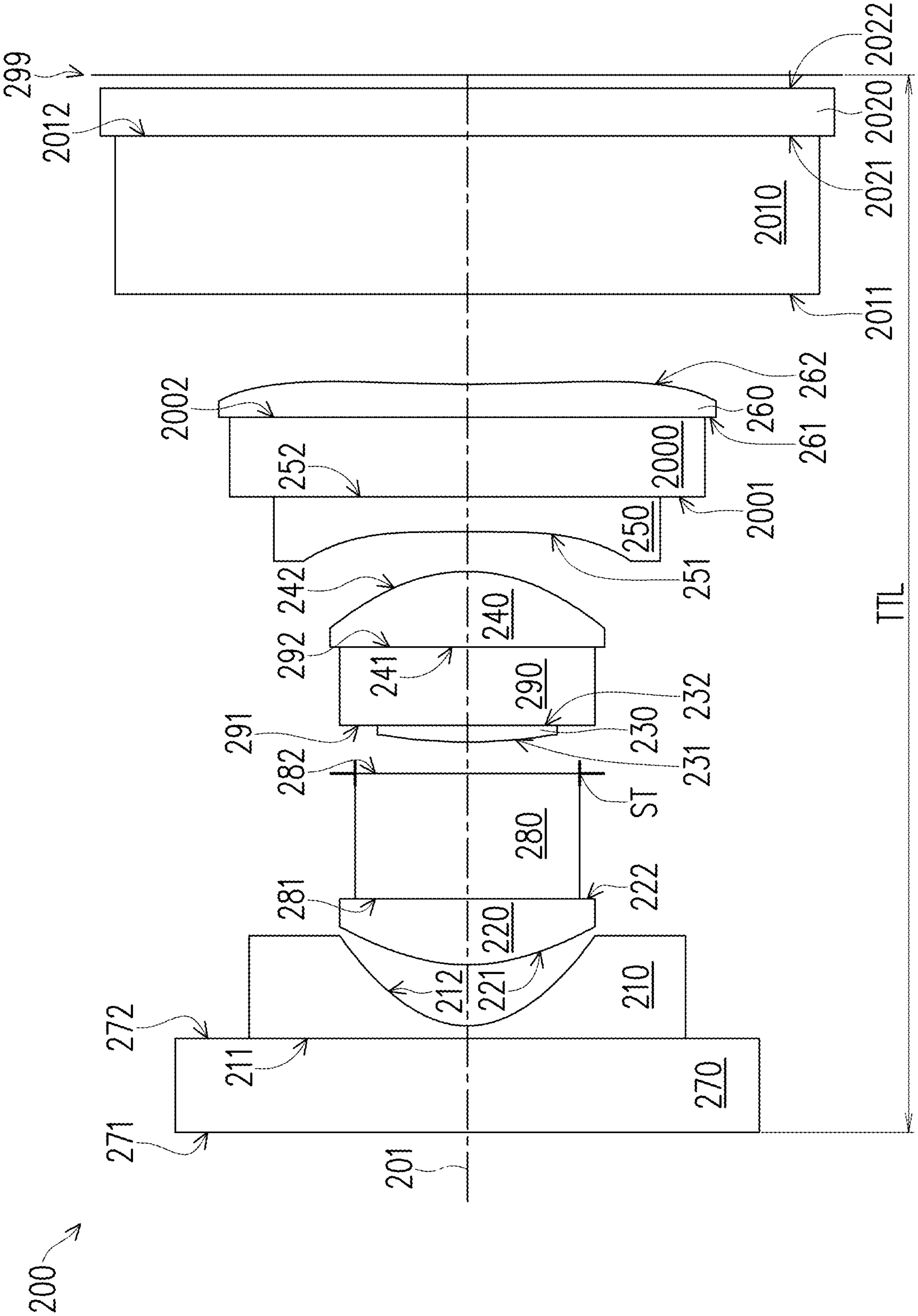
FIG. 2A is a schematic cross-sectional view of a compound lens, which is a first embodiment of the compound lens of FIG. 1.

FIG. 2A is a schematic cross-sectional view of a compound lens, which is a first embodiment of the compound lens of FIG. 1. Referring to FIG. 2A, FIG. 2A shows a compound lens 200, which is an example of lens 182 of camera 180 in FIG. 1. The compound lens 200 includes six coaxially aligned lenses along an optical axis 201: (i) a first substrate 270, and a first lens 210 and, in order of increasing distance therefrom, and on a same side thereof, (ii) a second lens 220, a second substrate 280, a third lens 230, a third substrate 290, a fourth lens 240, a fifth lens 250, a fourth substrate 2000 and a sixth lens 260. The first lens 210 and the fifth lens 250 are negative lenses (i.e., have negative refractive power). The second lens 220 and the fourth lens 240 are positive lenses (i.e., have positive refractive power).

Specifically, in this embodiment, the first substrate 270, the first lens 210, the second lens 220, the second substrate 280, the third lens 230, the third substrate 290, the fourth lens 240, the fifth lens 250, the fourth substrate 2000 and the sixth lens 260 respectively has a surface 271, a surface 211, a second lens surface 221, a second planar surface 281, a third lens surface 231, a third planar surface 291, a surface 241, a fifth lens surface 251, a fifth planar surface 2001 and a surface 261 facing away from an image plane 299, which could be represented as object-side surfaces. The first substrate 270, the first lens 210, the second lens 220, the second substrate 280, the third lens 230, the third substrate 290, the fourth lens 240, the fifth lens 250, the fourth substrate 2000 and the sixth lens 260 respectively further has a first planar surface 272, a first lens surface 212, a surface 222, a surface 282, a surface 232, a fourth planar surface 292, a fourth lens surface 242, a surface 252, a sixth planar surface 2002 and a six lens surface 262 facing the image plane 299, which could be represented as image-side surfaces.

In this embodiment, the first substrate 270 could be a glass substrate, but the disclosure is not limited thereto. The first lens 210 may be a plano-concave lens. The first lens 210 is bonded to the first planar surface 272, i.e., the surface 211 of the first lens 210 and the first planar surface 272 of the first substrate 270 are coplanar. Moreover, the first lens 210 has the first lens surface 212 which is paraxial concave facing the image plane 299.

In this embodiment, the second substrate 280 could be a glass substrate, but the disclosure is not limited thereto. The second lens 220 may be a plano-convex lens. The second lens 220 is bonded to the second planar surface 281, i.e., the surface 222 of the second lens 220 and the second planar surface 281 of the second substrate 280 are coplanar. Moreover, the second lens 220 has the second lens surface 221 which is paraxial convex facing away from the image plane 299.

In this embodiment, the third substrate 290 could be a glass substrate, but the disclosure is not limited thereto. The third lens 230 is positive lens and may be a plano-convex lens. The third lens 230 is bonded to the third planar surface 291, i.e., the surface 232 of the third lens 230 and the third planar surface 291 of the third substrate 290 are coplanar. Moreover, the third lens 230 has the third lens surface 231 which is a paraxial convex facing away the image plane 299.

In this embodiment, the fourth lens 240 may be a plano-convex lens. The fourth lens 240 is bonded to the fourth planar surface 292, i.e., the surface 241 of the fourth lens 240 and the fourth planar surface 292 of the third substrate 290 are coplanar. Moreover, the fourth lens 240 has the fourth lens surface 242 which is a paraxial convex facing the image plane 299.

In this embodiment, the fourth substrate 2000 could be a glass substrate, but the disclosure is not limited thereto. The fifth lens 250 may be a plano-concave lens. The fifth lens 250 is bonded to the fifth planar surface 2001, i.e., the surface 252 of the fifth lens 250 and the fifth planar surface 2001 of the fourth substrate 2000 are coplanar. Moreover, the fifth lens 250 has the fifth lens surface 251 which is a paraxial concave facing away the image plane 299.

In this embodiment, the sixth lens 260 is negative lens and may be a plano-concave lens. The sixth lens 260 is bonded to the sixth planar surface 2002, i.e., the surface 261 of the sixth lens 260 and the sixth planar surface 2002 of the fourth substrate 2000 are coplanar. Moreover, the sixth lens 260 has the sixth lens surface 262 which is a paraxial concave facing the image plane 299.

TABLE 1

First embodiment
Fno = 5.5, FOV = 129°, EFL = 0.76 mm

| Element | Type | Radius of curvature (mm) | Thickness (mm) | Refractive Index | Abbe number | Aperture (mm) |
|---|---|---|---|---|---|---|
| Object | Sphere | Infinity | 15 | | | 89.862 |
| 271 | Sphere | Infinity | 0.3 | 1.52 | 62.6 | 1.855 |
| 211 | Sphere | Infinity | 0.04 | 1.51 | 57.0 | 1.375 |
| 212 | Asphere | 0.276 | 0.194 | | | 0.808 |
| 221 | Asphere | 0.603 | 0.210 | 1.62 | 26.4 | 0.809 |
| 281 | Sphere | Infinity | 0.400 | 1.52 | 62.6 | 0.710 |
| Stop ST | Sphere | Infinity | 0.100 | | | 0.220 |
| 231 | Asphere | 1.650 | 0.052 | 1.51 | 57.0 | 0.539 |
| 291 | Sphere | Infinity | 0.25 | 1.52 | 62.6 | 0.568 |
| 241 | Sphere | Infinity | 0.240 | 1.51 | 57.0 | 0.810 |
| 242 | Asphere | −0.527 | 0.130 | | | 0.870 |
| 251 | Asphere | −4.656 | 0.109 | 1.62 | 26.4 | 1.033 |
| 2001 | Sphere | Infinity | 0.250 | 1.52 | 62.6 | 1.241 |
| 261 | Sphere | Infinity | 0.109 | 1.62 | 26.4 | 1.514 |
| 262 | Asphere | 8.589 | 0.285 | | | 1.569 |
| 2011 | Sphere | Infinity | 0.505 | 1.52 | 62.6 | 1.916 |
| 2021 | Sphere | Infinity | 0.15 | 1.52 | 62.6 | 2.235 |
| Air gap | Sphere | Infinity | 0.045 | | | 2.330 |
| 299 | Sphere | Infinity | 0 | | | 2.384 |

Table 1 shows other detailed optical data of the first embodiment. A F-number (Fno) of the compound lens 200 according to the first embodiment is 5.5, a field of view (FOV) is 129 degrees, and an effective focal length (EFL) is 0.76 millimeters (mm).

TABLE 2

| Surface | K | $a_4$ | $a_6$ | $a_8$ | $a_{10}$ |
|---|---|---|---|---|---|
| 212 | −1.271 | 1.127 | −1.244 | 0 | 0 |
| 221 | 0.099 | −1.164 | −0.015 | −7.843 | 0 |
| 231 | 15.943 | −0.694 | 4.497 | −39.967 | 0 |
| 242 | −1.703 | −0.907 | 0.991 | 6.982 | 0 |
| 251 | 0 | −0.886 | 0.330 | −1.613 | −2.410 |
| 262 | −30.317 | −0.120 | −0.158 | −0.040 | 0 |

Table 2 shows the aspheric surface parameters of the compound lens 200 according to the first embodiment of the disclosure. The units of quantities in Table 2 are expressed in millimeters. In the embodiment, the first lens surface 212 of the first lens 210, the second lens surface 221 of the second lens 220, the third lens surface 231 of the third lens 230, the fourth lens surface 242 of the fourth lens 240, the fifth lens surface 251 of the fifth lens 250, and the sixth lens surface 262 of the sixth lens 260 are aspheric surfaces. These aspheric surfaces are defined by the following formula:

$$Z_{sag} = \frac{r^2}{R} \Big/ \left(1 + \sqrt{1 - (1 + K)\frac{r^2}{R^2}}\right) + \sum_{i=1}^{n} a_i \times r^i \qquad (1)$$

where,

R: a radius of curvature of the lens surface near to the optical axis 201, $Z_{sag}$: a function of radial coordinate r, where directions z and r are respectively parallel to and perpendicular to optical axis 201, K: a conic constant, and $a_i$: an i-th aspheric surface coefficient.

In addition, the compound lens 200 in this embodiment further includes a stop ST, a filter 2010 and a cover glass

2020 sequentially arranges along the optical axis 201. The stop ST is disposed between the second substrate 280 and the third lens 230. The filter 2010 is disposed between the sixth lens 260 and the cover glass 2020. Moreover, the filter 2010 and the cover glass 2020 respectively has a surface 2011 and 2021 facing away from the image plane 299, which could be represented as object-side surfaces. The filter 2010 and the cover glass 2020 respectively further has a surface 2012 and 2022 facing the image plane 299, which could be represented as image-side surfaces. The filter 2010 may be an IR cut filter, but the disclosure is not limited thereto.

Furthermore, in this embodiment, Abbe numbers of the first lens 210, the third lens 230 and the fourth lens 240 are larger than Abbe numbers of the second lens 220, the fifth lens 250 and the sixth lens 260.

Figure 2B:
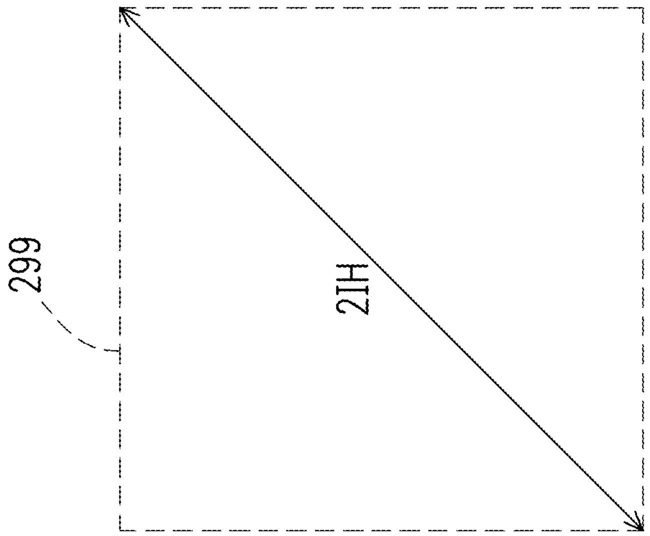
FIG. 2B is a schematic diagram of the definition of diagonal diameter of the image plane in FIG. 2A.

FIG. 2B is a schematic diagram of the definition of diagonal diameter of the image plane in FIG. 2A. Referring to FIGS. 2A and 2B, in this embodiment, the compound lens 200 satisfies a following conditional expression: TTL/IH<4, where TTL is a total track length from the surface 271 of the first substrate 270 to the image plane 299, and IH is a half diagonal diameter of the image plane 299 (or the image height), wherein the image plane 299 may be represented as a sensing surface of a sensor of the camera 180. Thus, since the compound lens 200 of the disclosure satisfies the conditional expression of TTL/IH<4, the overall length of the compound lens 200 could be limited and a compact camera 180 could be obtained.

Furthermore, in this embodiment, the compound lens 200 satisfies a following conditional expression: 1<R2/R1<8, where R1 is a radius of the first lens surface 212 of the first lens 210 facing the image plane 299, and R2 is a radius of the second lens surface 221 of the second lens 220 facing away from the image plane 299. Thus, the aforementioned conditional expression is configured to ensure the ratio of refractive powers of the second lens 220 and first lens 210, so that the compound lens 200 could have wide FOV and compact system.

Furthermore, in this embodiment, the compound lens 200 satisfies a following conditional expression: 1<R5/R4<10, where R4 is a radius of the fourth lens surface 242 of the fourth lens 240 facing the image plane 299, and R5 is a radius of a fifth lens surface 251 of the fifth lens 250 facing away from the image plane 299. Thus, the aforementioned conditional expression is configured to ensure the ratio of refractive power of the fourth lens 240 and fifth lens 250, so that the compound lens 200 could have small chief ray angle at the corner field.

FIG. 3A to 3D are diagrams of the longitudinal spherical aberration and various aberrations of the compound lens according to the first embodiment in FIG. 2A. Referring to FIGS. 3A to 3D, FIG. 3A illustrates the longitudinal spherical aberration of the first embodiment when the wavelength are 420 nm, 475 nm, 520 nm, 570 nm, 600 nm, and 640 nm. FIGS. 3B and 3C respectively illustrates an astigmatic field curvature aberration in a sagittal direction and an astigmatic field curvature aberration in a tangential direction on the image plane 299 according to the first embodiment when the wavelength are 420 nm, 475 nm, 520 nm, 570 nm, 600 nm, and 640 nm. FIG. 3D illustrates a distortion aberration on the image plane 299 according to the first embodiment when the wavelength are 420 nm, 475 nm, 520 nm, 570 nm, 600 nm, and 640 nm (the six curves overlap to each other).

The longitudinal spherical aberration of the first embodiment is shown in FIG. 3A, in which a curve formed by each wavelength is very close to other curves and approaches the middle, illustrating that off-axis rays at different heights of each wavelength are concentrated near an imaging point, therefore the embodiment does significantly improve the spherical aberration of the same wavelength. In addition, distances between the six representative wavelengths are also quite close to each other, indicating that imaging positions of rays of the different wavelengths are already quite concentrated, thus, significantly improving chromatic aberration. In the two astigmatic field curvature aberration diagrams of FIGS. 3B and 3C, an amount of focal length variation of the six representative wavelengths in the entire image plane are small. This illustrates that the optical system according to the first embodiment can effectively eliminate aberration. The distortion aberration diagram of FIG. 3D shows that the distortion aberration of the first embodiment is maintained within a small range, indicating that the distortion aberration of the first embodiment has met the imaging quality requirements of the optical system.

Figure 3E:
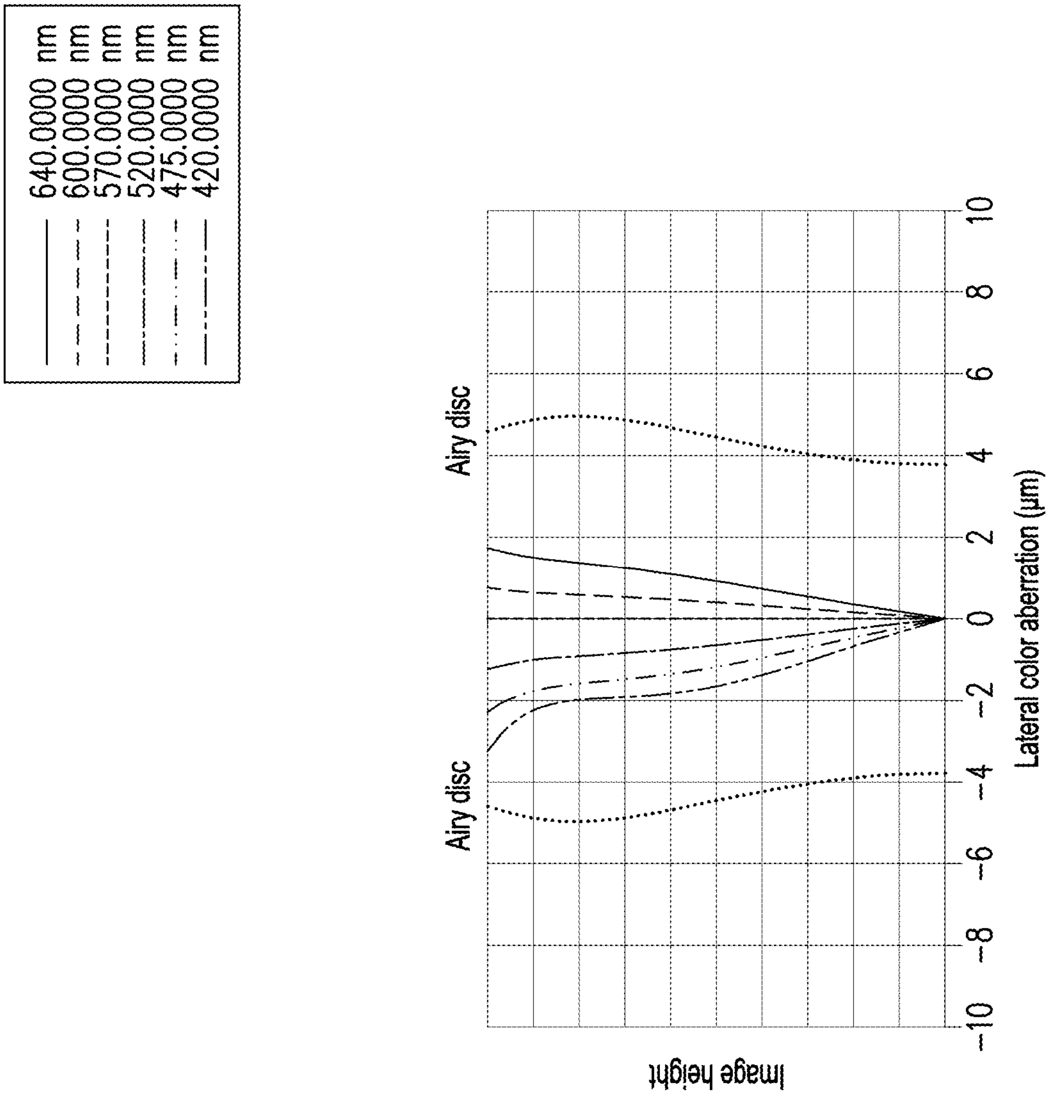
FIG. 3E is diagram of lateral color aberration of the compound lens according to the first embodiment in FIG. 2A.
Figure 3F:
FIG. 3F is diagram of focal shift with respect to different wavelength of the compound lens according to the first embodiment in FIG. 2A.

FIG. 3E is diagram of lateral color aberration of the compound lens according to the first embodiment in FIG. 2A. FIG. 3F is diagram of focal shift with respect to different wavelength of the compound lens according to the first embodiment in FIG. 2A. Referring to FIG. 3E, an airy disc in FIG. 3E is a position of the airy disc, and the maximum image height is 1.1090 millimeters. The lateral color aberration of FIG. 3E shows that the lateral color aberration of the first embodiment maintains within a small range. Referring to FIG. 3F, FIG. 3F illustrates the focal shift of the compound lens 200 also maintains within a small range. Therefore, the present embodiment can provide higher sensor resolution and ultra-wide FOV while maintaining favorable optical performance.

Based on the foregoing, the compound lens 200 in the embodiments includes a first lens 210, a second lens 220, a third lens 230, a fourth lens 240, a fifth lens 250 and a sixth lens 260. The refractive powers of lenses are designed as: the first lens 210 and the fifth lens 250 are negative lenses, and the second lens 220 and the fourth lens 240 are positive lenses. The additional fifth lens 250 and sixth lens 260 in the compound lens 200 improve the capability to decrease transverse ray aberration (the distance on the image plane that a real ray differs from the ideal image point) and axial color aberration, and therefore, the compound lens 200 in the embodiment could provide good imaging quality, higher sensor resolution (for example, camera with resolution of 1500 pixels×1500 pixels) and ultra-wide FOV (for example, FOV>130 degrees). Besides the aberrations could be eliminated, the compound lens 200 could also be used in a wide band of wavelength (For example, from visible light to near infrared (850 nm)).

Figure 4:
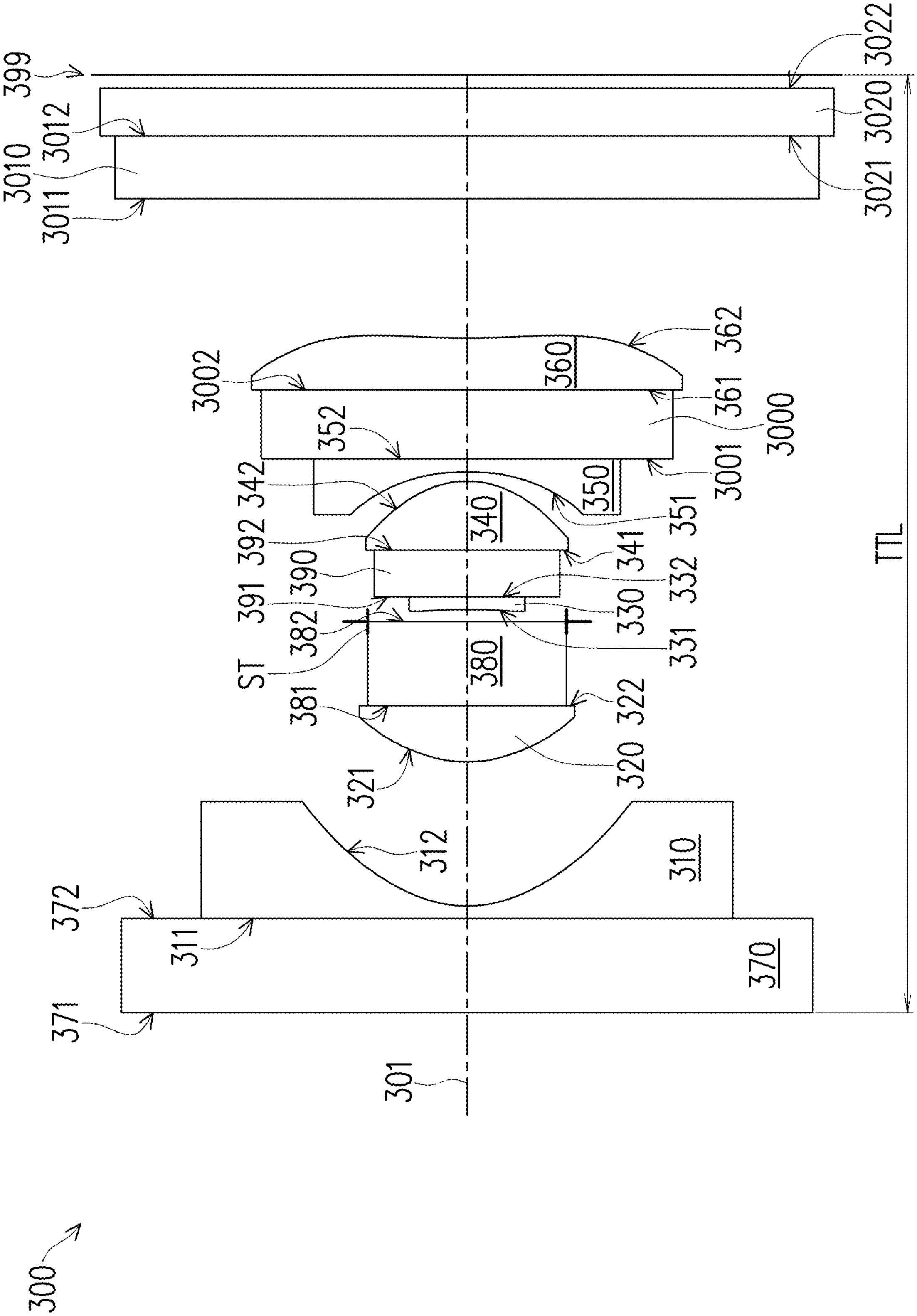
FIG. 4 is a schematic cross-sectional view of a compound lens, which is a second embodiment of the compound lens of FIG. 1.

FIG. 4 is a schematic cross-sectional view of a compound lens, which is a second embodiment of the compound lens of FIG. 1. Referring to FIG. 4, the second embodiment of the compound lens 300 of the disclosure is roughly similar to the first embodiment, except for the optical data and the aspheric surface coefficients. Specifically, the compound lens 300 in this embodiment includes four coaxially aligned lenses along an optical axis 301: (i) a first substrate 370, and a first lens 310 and, in order of increasing distance therefrom, and on a same side thereof, (ii) a second lens 320, a second substrate 380, a third lens 330, a third substrate 390, a fourth lens 340, a fifth lens 350, a fourth substrate 3000 and a sixth lens 360. The first substrate 370, the first lens 310, the second lens 320, the second substrate 380, the third lens 330, the third substrate 390, the fourth lens 340, the fifth lens 350, the fourth substrate 3000 and the sixth lens 360 respectively has a surface 371, a surface 311, a second lens surface 321, a second planar surface 381, a third lens surface 331, a third planar surface 391, a surface 341, a fifth lens surface 351, a fifth planar surface 3001 and a surface 361 facing away from an image plane 399, which could be represented as object-side surfaces. The first substrate 370, the first lens 310, the second lens 320, the second substrate 380, the third lens 330, the third substrate 390, the fourth lens 340, the fifth lens 350, the fourth substrate 3000 and the sixth lens 360 respectively further has a first planar surface 372, a first lens surface 312, a surface 322, a surface 382, a surface 332, a surface 392, a fourth lens surface 342, a surface 352, a sixth planar surface 3002 and a six lens surface 362 facing the image plane 399, which could be represented as image-side surfaces.

Furthermore, in this embodiment, the third lens 330 is negative lens. The third lens 330 is bonded to the third planar surface 391 and has the third lens surface 331 which is a paraxial concave facing away the image plane 399.

TABLE 3

| Second embodiment Fno = 5.5, FOV = 140°, EFL = 0.8 mm | | | | | | |
|---|---|---|---|---|---|---|
| Element | Type | Radius of curvature (mm) | Thick-ness (mm) | Refractive Index | Abbe number | Aperture (mm) |
| Object | Sphere | Infinity | 15 | | | 149.260 |
| 371 | Sphere | Infinity | 0.3 | 1.52 | 62.6 | 2.190 |
| 311 | Sphere | Infinity | 0.04 | 1.51 | 61.2 | 1.681 |
| 312 | Asphere | 0.388 | 0.458 | | | 1.045 |
| 321 | Asphere | 0.431 | 0.178 | 1.53 | 47.6 | 0.681 |
| 381 | Sphere | Infinity | 0.268 | 1.52 | 62.6 | 0.627 |
| Stop ST | Sphere | Infinity | 0.037 | | | 0.215 |
| 331 | Asphere | −2.167 | 0.04 | 1.62 | 26.2 | 0.301 |
| 391 | Sphere | Infinity | 0.15 | 1.52 | 62.6 | 0.365 |
| 341 | Sphere | Infinity | 0.217 | 1.51 | 61.2 | 0.591 |
| 342 | Asphere | −0.287 | 0.03 | | | 0.643 |
| 351 | Asphere | −0.646 | 0.04 | 1.62 | 26.2 | 0.736 |
| 3001 | Sphere | Infinity | 0.229 | 1.52 | 62.6 | 0.968 |
| 361 | Sphere | Infinity | 0.156 | 1.52 | 57.3 | 1.304 |
| 362 | Asphere | 2.411 | 0.442 | | | 1.348 |
| 3011 | Sphere | Infinity | 0.2 | 1.52 | 62.6 | 2.062 |
| 3021 | Sphere | Infinity | 0.15 | 1.52 | 62.6 | 2.212 |
| Air gap | Sphere | Infinity | 0.045 | | | 2.325 |
| 399 | Sphere | Infinity | 0 | | | 2.385 |

The detailed optical data of the compound lens 300 according to the second embodiment is shown in Table 3. The Fno of the compound lens 300 according to the second embodiment is 5.5, the FOV is 140 degrees, and the EFL is 0.8 mm.

TABLE 4

| Surface | K | $a_4$ | $a_6$ | $a_8$ | $a_{10}$ |
|---|---|---|---|---|---|
| 312 | −1.568 | 0.440 | 0.448 | 0 | 0 |
| 321 | −2.629 | 2.514 | −4.266 | 20.849 | 0 |
| 331 | 4.821 | −2.883 | 5.933 | −1090.988 | 0 |
| 342 | −1.977 | −3.939 | 2.489 | 17.853 | 0 |
| 351 | −0.679 | −0.666 | −15.198 | 68.909 | 25.005 |
| 362 | 6.669 | −1.517 | 1.880 | −3.291 | 1.835 |

The aspheric surface coefficients of the first lens surface 312 of the first lens 310, the second lens surface 321 of the second lens 320, the third lens surface 331 of the third lens 330, the fourth lens surface 342 of the fourth lens 340, the fifth lens surface 351 of the fifth lens 350, and the sixth lens surface 362 of the sixth lens 360 according to the second embodiment in the formula (1) are shown in Table 4.

Furthermore, in this embodiment, Abbe numbers of the first lens 310, the fourth lens 340 and the sixth lens 360 are larger than Abbe numbers of the third lens 330 and the fifth lens 350, and the disclosure is not limited the Abbe number of the second lens 320.

Similarly, the compound lens 300 in this embodiment further includes a stop ST, a filter 3010 and a cover glass 3020 sequentially arranges along the optical axis 301. The stop ST is disposed between the second substrate 380 and the third lens 330. The filter 3010 is disposed between the sixth lens 360 and the cover glass 3020. Moreover, the filter 3010 and the cover glass 3020 respectively has a surface 3011 and 3021 facing away from the image plane 399, which could be represented as object-side surfaces. The filter 3010 and the cover glass 3020 respectively further has a surface 3012 and 3022 facing the image plane 399, which could be represented as image-side surfaces. The filter 3010 may be an IR cut filter, but the disclosure is not limited thereto.

Furthermore, in this embodiment, the compound lens 300 satisfies a following conditional expression: $V6-V5>20$, where V5 is an Abbe number of the fifth lens 350, and V6 is an Abbe number of the sixth lens 360. Thus, since the compound lens 300 of the disclosure satisfies the conditional expression of $V6-V5>20$, the axial chromatic aberration of the compound lens 300 is corrected.

Figure 5A:
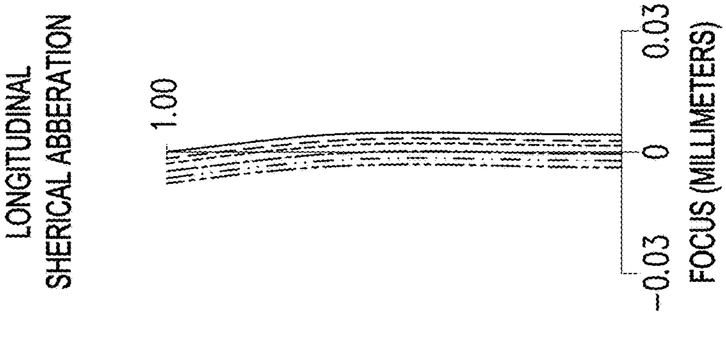
FIG. 5A to 5D are diagrams of the longitudinal spherical aberration and various aberrations of the compound lens according to the second embodiment in FIG. 4.
Figure 5B:
Figure 5C:
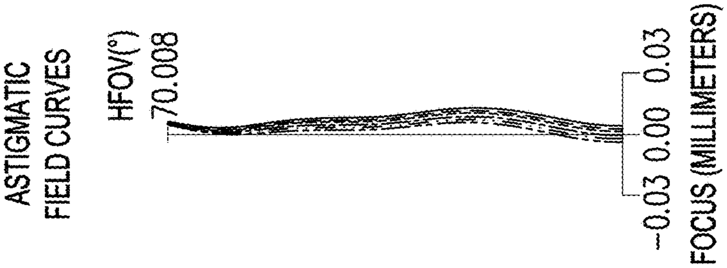
Figure 5D:
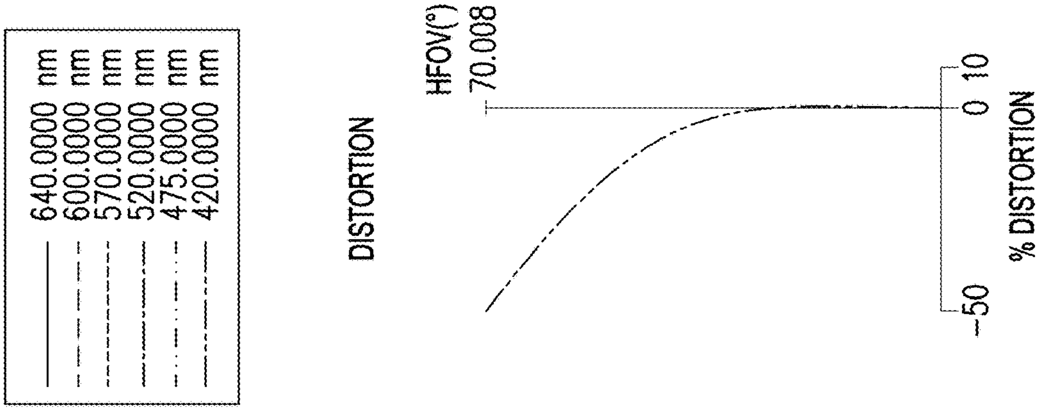
Figure 5E:
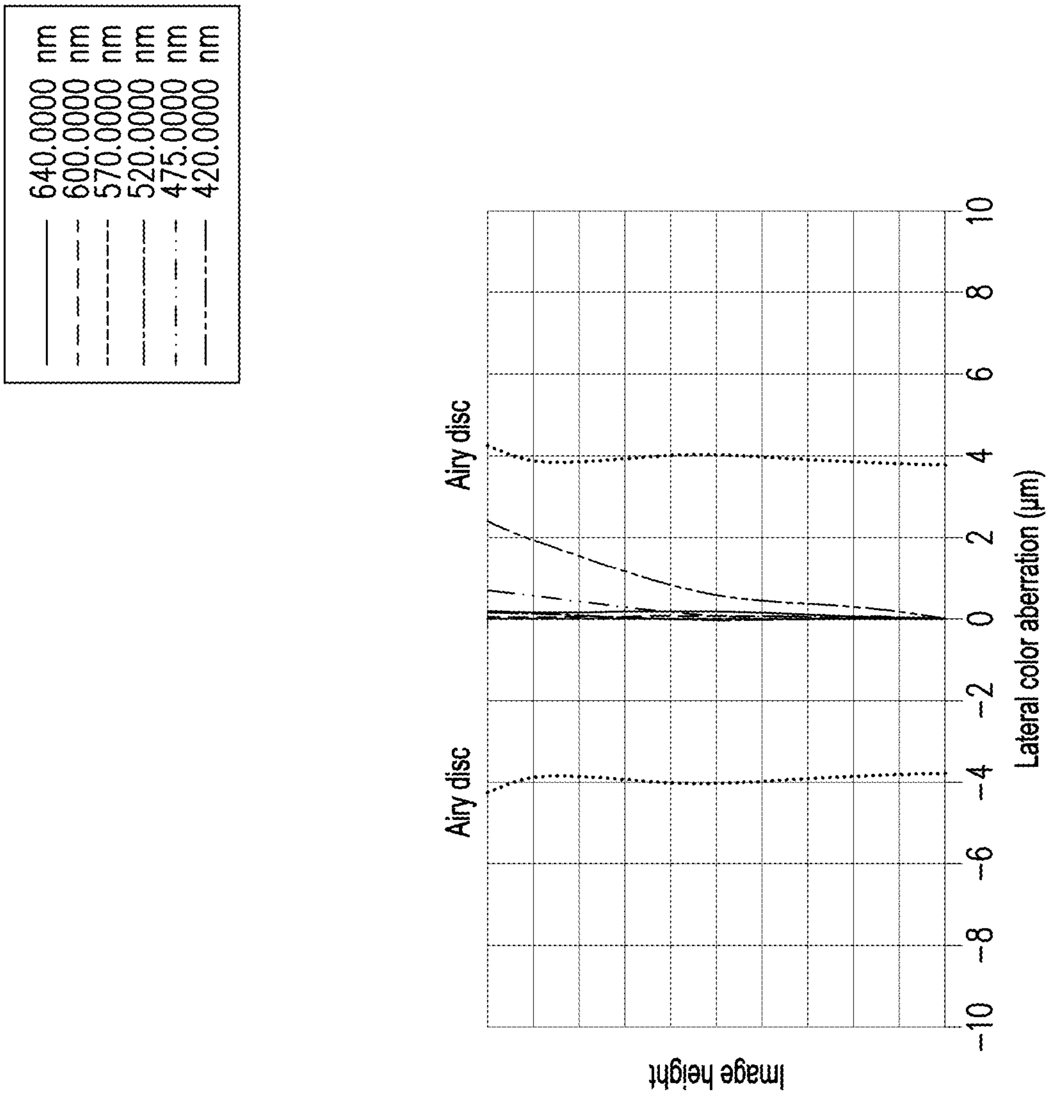
FIG. 5E is diagram of lateral color aberration of the compound lens according to the second embodiment in FIG. 4.
Figure 5F:
FIG. 5F is diagram of focal shift with respect to different wavelength of the compound lens according to the second embodiment in FIG. 4.

FIG. 5A to 5D are diagrams of the longitudinal spherical aberration and various aberrations of the compound lens according to the second embodiment in FIG. 4. FIG. 5E is diagram of lateral color aberration of the compound lens according to the second embodiment in FIG. 4. FIG. 5F is diagram of focal shift with respect to different wavelength of the compound lens according to the second embodiment in FIG. 4. Referring to FIGS. 5A to 5F, in this embodiment, it may be seen from FIGS. 5A to 5F that the longitudinal spherical aberration, the astigmatic field curves aberration, distortion aberration, lateral color aberration and focal shift are all maintained within a small range. Thus, the compound lens 300 in the embodiments could also provide good imaging quality.

Furthermore, since the sixth lens 360 of the compound lens 300 is designed to satisfy the following conditional expression: $V6-V5>20$, comparing to the first embodiment, the longitudinal chromatic aberration (FIG. 5A) and the focal shift (FIG. 5F) of the compound lens 300 in the second embodiment are smaller and better. The other advantages of the compound lens 300 are the same as those of the compound lens 200 of FIG. 2A and will not be repeated.

Figure 6:
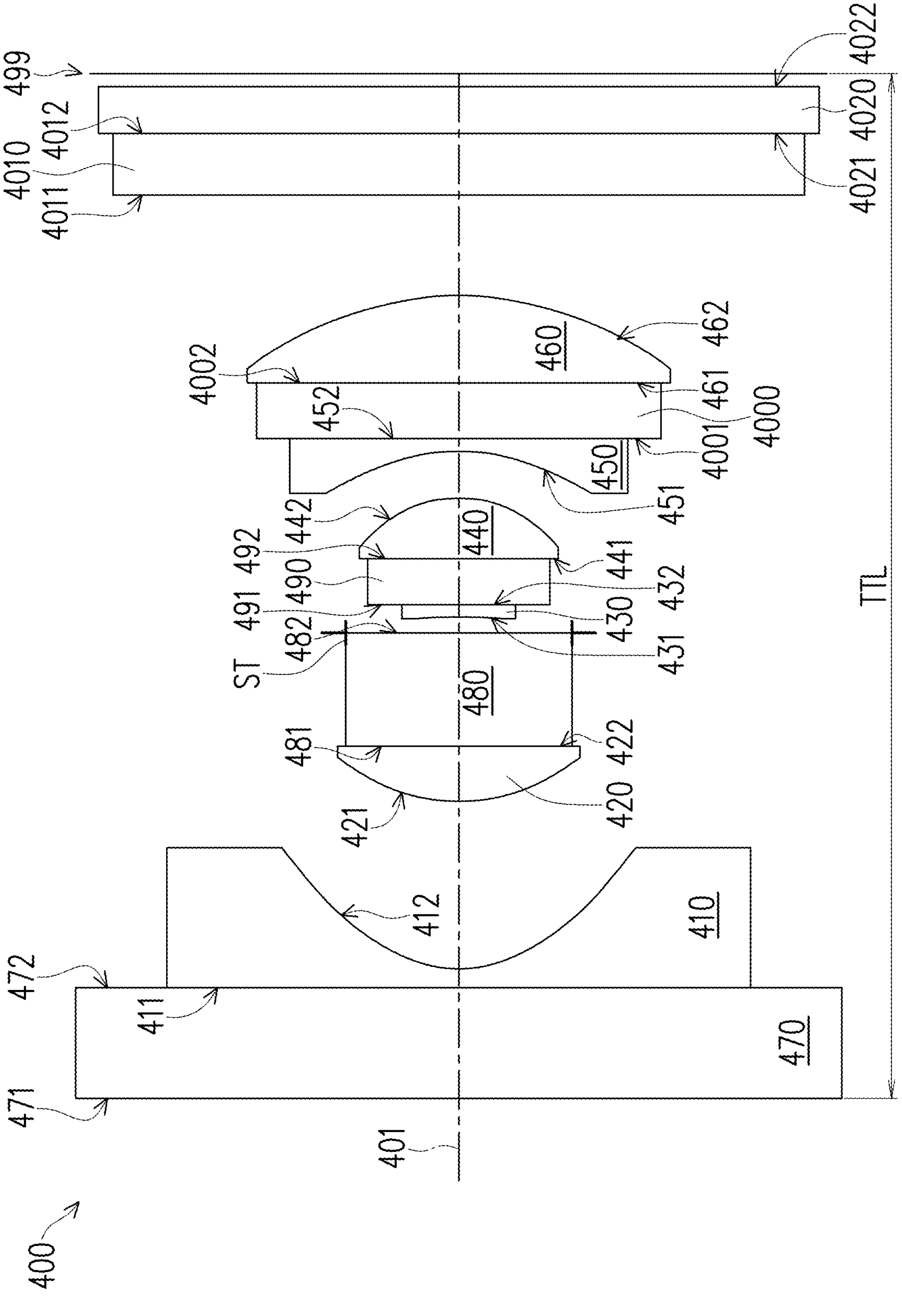
FIG. 6 is a schematic cross-sectional view of a compound lens, which is a third embodiment of the compound lens of FIG. 1.

FIG. 6 is a schematic cross-sectional view of a compound lens, which is a third embodiment of the compound lens of FIG. 1. Referring to FIG. 6, the third embodiment of the compound lens 400 of the disclosure is roughly similar to the first embodiment, except for the optical data and the aspheric surface coefficients. Specifically, the compound lens 400 in this embodiment includes four coaxially aligned lenses along an optical axis 401: (i) a first substrate 470, and a first lens 410 and, in order of increasing distance therefrom, and on a same side thereof, (ii) a second lens 420, a second substrate 480, a third lens 430, a third substrate 490, a fourth lens 440, a fifth lens 450, a fourth substrate 4000 and a sixth lens 460. The first substrate 470, the first lens 410, the second lens 420, the second substrate 480, the third lens 430, the third substrate 490, and the fourth lens 440, the fifth lens 450, the fourth substrate 4000 and the sixth lens 460 respectively has a surface 471, a surface 411, a second lens surface 421, a second planar surface 481, a third lens surface 431, a third planar surface 491, a surface 441, a fifth lens surface 451, a fifth planar surface 4001 and a surface 461 facing away from an image plane 499, which could be represented as object-side surfaces. The first substrate 470, the first lens 410, the second lens 420, the second substrate 480, the third lens 430, the third substrate 490, the fourth lens 440, the fifth lens 450, the fourth substrate 4000 and the sixth lens 460 respectively further has a first planar surface 472, a first lens surface 412, a surface 422, a surface 482, a surface 432, a surface 492, a fourth lens surface 442, a surface 452, a sixth planar surface 4002 and a six lens surface 462 facing the image plane 499, which could be represented as image-side surfaces.

Furthermore, in this embodiment, the third lens 430 is negative lens and the sixth lens 460 is positive lens. The third lens 430 is bonded to the third planar surface 491 and has the third lens surface 431 which is a paraxial concave facing away the image plane 499. The sixth lens 460 is bonded to the sixth planar surface 4002 and has the sixth lens surface 462 which is a paraxial convex facing the image plane 499.

TABLE 5

| Third embodiment Fno = 5.5, FOV = 140°, EFL = 0.75 mm | | | | | | |
|---|---|---|---|---|---|---|
| Element | Type | Radius of curvature (mm) | Thick-ness (mm) | Refractive Index | Abbe number | Aperture (mm) |
| Object | Sphere | Infinity | 15 | | | 131.907 |
| 471 | Sphere | Infinity | 0.3 | 1.52 | 62.6 | 2.074 |
| 411 | Sphere | Infinity | 0.040 | 1.51 | 61.2 | 1.570 |
| 412 | Asphere | 0.341 | 0.458 | | | 0.925 |
| 421 | Asphere | 0.472 | 0.159 | 1.55 | 40.6 | 0.656 |
| 481 | Sphere | Infinity | 0.295 | 1.52 | 62.6 | 0.611 |
| Stop ST | Sphere | Infinity | 0.040 | | | 0.218 |
| 431 | Asphere | −1.173 | 0.04 | 1.62 | 26.2 | 0.281 |
| 491 | Sphere | Infinity | 0.120 | 1.52 | 62.6 | 0.344 |
| 441 | Sphere | Infinity | 0.158 | 1.51 | 61.2 | 0.511 |
| 442 | Asphere | −0.318 | 0.127 | | | 0.560 |
| 451 | Asphere | −0.464 | 0.040 | 1.62 | 26.2 | 0.725 |
| 4001 | Sphere | Infinity | 0.150 | 1.52 | 62.6 | 0.908 |
| 461 | Sphere | Infinity | 0.236 | 1.51 | 61.2 | 1.100 |
| 462 | Asphere | −0.715 | 0.660 | | | 1.139 |
| 4011 | Sphere | Infinity | 0.2 | 1.52 | 62.6 | 2.096 |
| 4021 | Sphere | Infinity | 0.15 | 1.52 | 62.6 | 2.230 |
| Air gap | Sphere | Infinity | 0.045 | | | 2.331 |
| 499 | Sphere | Infinity | 0 | | | 2.382 |

The detailed optical data of the compound lens 400 according to the third embodiment is shown in Table 5. The Fno of the compound lens 400 according to the second embodiment is 5.5, the FOV is 140 degrees, and the EFL is 0.75 mm.

TABLE 6

| Surface | K | $a_4$ | $a_6$ | $a_8$ | $a_{10}$ |
|---|---|---|---|---|---|
| 412 | −1.446 | 1.143 | 2.188 | 0.000 | 0 |
| 421 | −3.879 | 3.641 | −11.039 | 44.679 | 0 |
| 431 | −0.733 | −3.262 | −23.025 | −39.830 | 0 |
| 442 | −2.034 | −1.628 | −39.981 | 302.622 | 0 |
| 451 | −0.528 | 5.956 | −65.928 | 377.432 | −708.447 |
| 462 | −3.758 | 0.658 | −5.306 | 7.381 | −1.632 |

The aspheric surface coefficients of the first lens surface 412 of the first lens 410, the second lens surface 421 of the second lens 420, the third lens surface 431 of the third lens 430, the fourth lens surface 442 of the fourth lens 440, the fifth lens surface 451 of the fifth lens 450, and the sixth lens surface 462 of the sixth lens 460 according to the third embodiment in the formula (1) are shown in Table 6.

Furthermore, in this embodiment, Abbe numbers of the first lens 410, the fourth lens 440 and the sixth lens 460 are larger than Abbe numbers of the third lens 430 and the fifth lens 450, and the disclosure is not limited the Abbe number of the second lens 420.

Similarly, the compound lens 400 in this embodiment further includes a stop ST, a filter 4010 and a cover glass 4020 sequentially arranges along the optical axis 401. The stop ST is disposed between the second substrate 480 and the third lens 430. The filter 4010 is disposed between the sixth lens 460 and the cover glass 4020. Moreover, the filter 4010 and the cover glass 4020 respectively has a surface 4011 and 4021 facing away from the image plane 499, which could be represented as object-side surfaces. The filter 4010 and the cover glass 4020 respectively further has a surface 4012 and 4022 facing the image plane 499, which could be represented as image-side surfaces. The filter 4010 may be an IR cut filter, but the disclosure is not limited thereto.

Furthermore, in this embodiment, the compound lens 400 satisfies a following conditional expression: $V6-V5>20$, where V5 is an Abbe number of the fifth lens 450, and V6 is an Abbe number of the sixth lens 460. Thus, since the compound lens 400 of the disclosure satisfies the conditional expression of $V6-V5>20$, the axial chromatic aberration of the compound lens 400 is corrected.

Figure 7A:
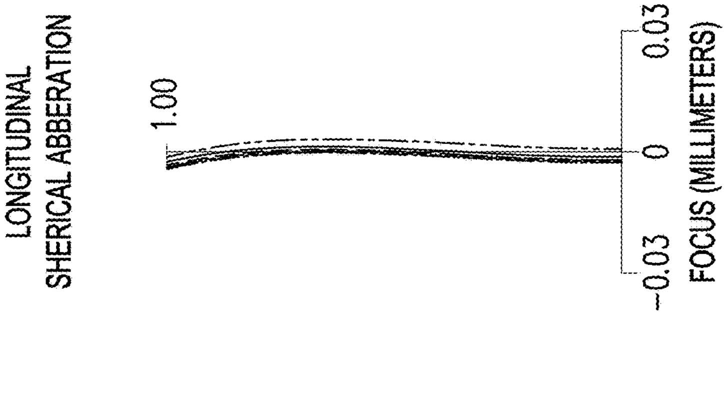
FIG. 7A to 7D are diagrams of the longitudinal spherical aberration and various aberrations of the compound lens according to the third embodiment in FIG. 6.
Figure 7B:
Figure 7C:
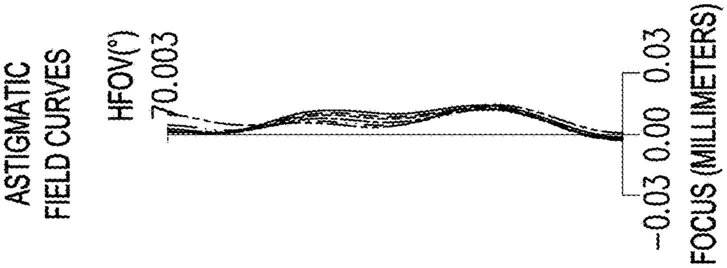
Figure 7D:
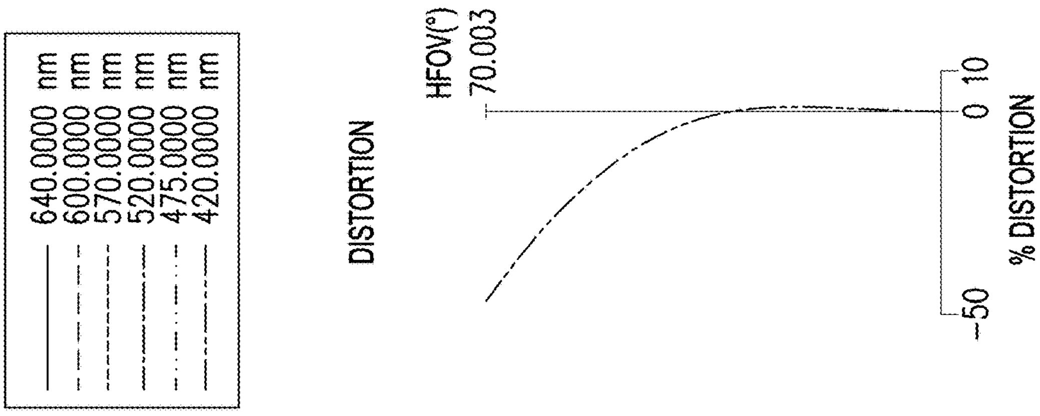
Figure 7E:
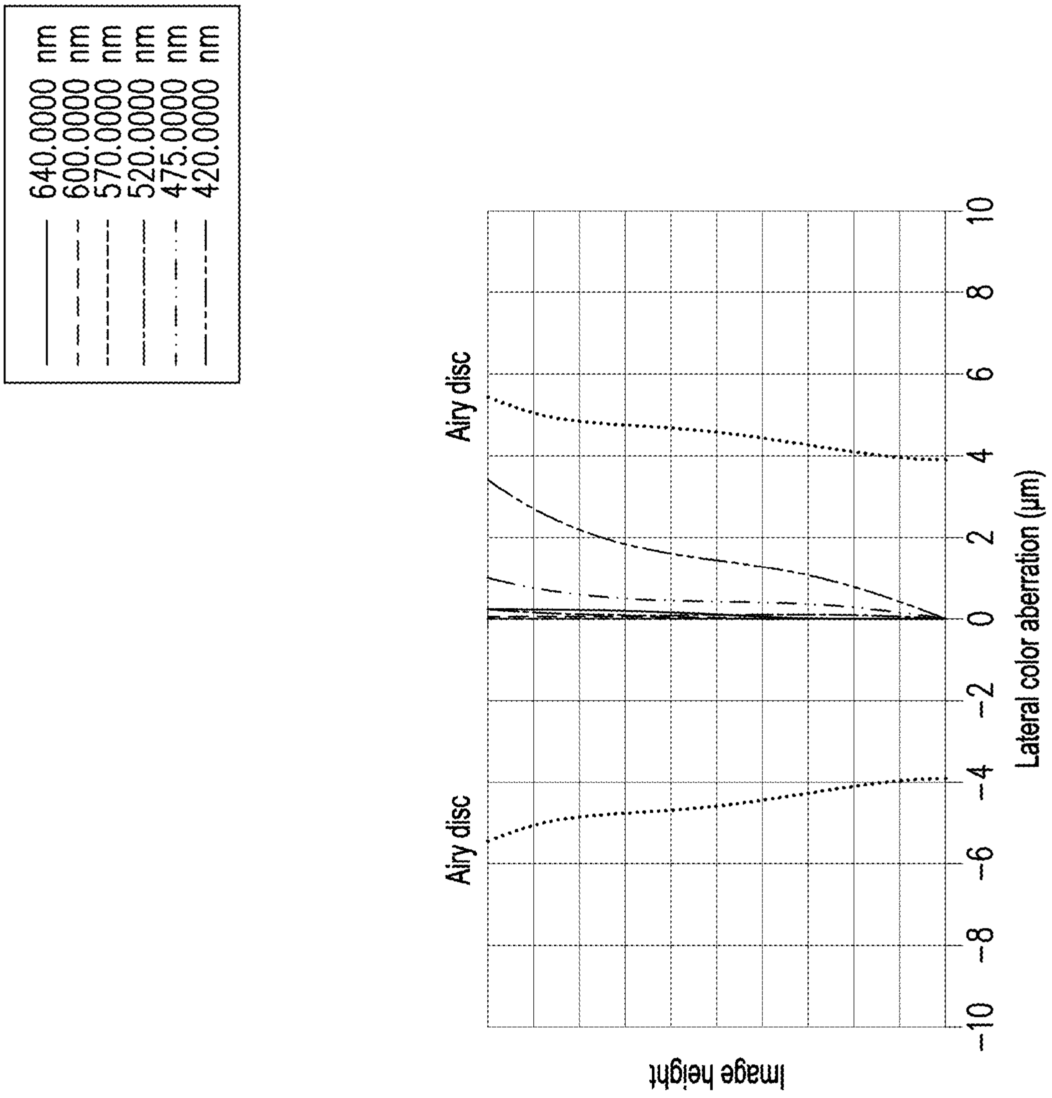
FIG. 7E is diagram of lateral color aberration of the compound lens according to the third embodiment in FIG. 6.
Figure 7F:
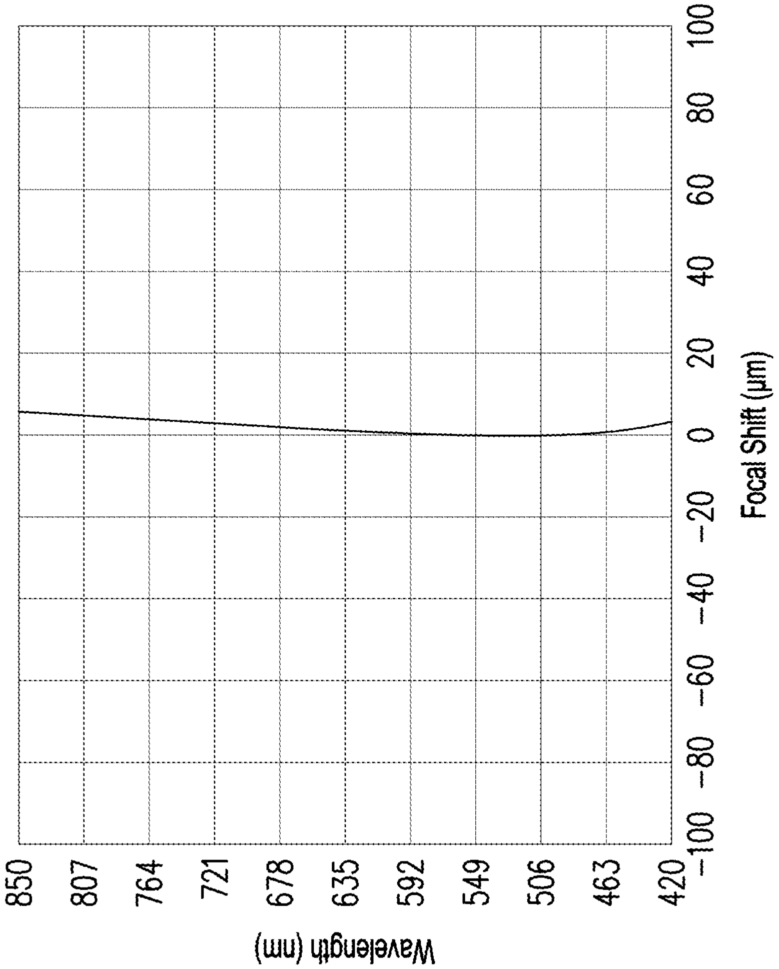
FIG. 7F is diagram of focal shift with respect to different wavelength of the compound lens according to the third embodiment in FIG. 6.

FIG. 7A to 7D are diagrams of the longitudinal spherical aberration and various aberrations of the compound lens according to the third embodiment in FIG. 6. FIG. 7E is diagram of lateral color aberration of the compound lens according to the third embodiment in FIG. 6. FIG. 7F is diagram of focal shift with respect to different wavelength of the compound lens according to the third embodiment in FIG. 6. Referring to FIGS. 7A to 7F, in this embodiment, it may be seen from FIGS. 7A to 7F that the longitudinal spherical aberration, the astigmatic field curves aberration, distortion aberration, lateral color aberration and focal shift are all maintained within a small range. Thus, the compound lens 400 in the embodiments could also provide good imaging quality.

Furthermore, since the sixth lens 460 of the compound lens 400 is designed to satisfy the following conditional expression: $V6-V5>20$, comparing to the first embodiment, the longitudinal chromatic aberration (FIG. 7A) and the focal shift (FIG. 7F) of the compound lens 400 in the third embodiment are smaller and better. The other advantages of the compound lens 400 are the same as those of the compound lens 200 of FIG. 2A and will not be repeated.

In conclusion, the compound lens in the embodiments includes a first lens, a second lens, a third lens, a fourth lens, a fifth lens and a sixth lens. Moreover, the first lens and the fifth lens are negative lenses, and the second lens and the fourth lens are positive lenses. Thus, the additional fifth lens and sixth lens in the compound lens improve the capability to decrease transverse ray aberration and axial color aberration, and therefore, the compound lens in the embodiment could provide good imaging quality, higher sensor resolution and ultra-wide FOV.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A compound lens comprising: six coaxially aligned lenses including (i) a first substrate, and a first lens and, in order of increasing distance therefrom, and on a same side thereof, (ii) a second lens, a second substrate, a third lens, a third substrate, a fourth lens, a fifth lens, a fourth substrate and a sixth lens;

wherein the first lens and the fifth lens are negative lenses; and wherein the second lens and the fourth lens are positive lenses.

2. The compound lens of claim 1, wherein the third lens is positive lens and the sixth lens is negative lens.

3. The compound lens of claim 1, wherein Abbe numbers of the first lens, the third lens and the fourth lens are larger than Abbe numbers of the second lens, the fifth lens and the sixth lens.

4. The compound lens of claim 1, wherein the third lens and the sixth lens are negative lenses.

5. The compound lens of claim 1, wherein the third lens is negative lens and the sixth lens is positive lens.

6. The compound lens of claim 1, wherein Abbe numbers of the first lens, the fourth lens and the sixth lens are larger than Abbe numbers of the third lens and the fifth lens.

7. The compound lens of claim 1, wherein the first substrate has a first planar surface facing an image plane, and the first lens is bonded to the first planar surface and has a first lens surface which is paraxial concave facing the image plane.

8. The compound lens of claim 1, wherein the second substrate has a second planar surface facing away from an image plane, and the second lens is bonded to the second planar surface and has a second lens surface which is paraxial convex facing away from the image plane.

9. The compound lens of claim 1, wherein the third substrate has a third planar surface facing away from an image plane, and the third lens is bonded to the third planar surface and has a third lens surface which is a paraxial convex facing away the image plane.

10. The compound lens of claim 1, wherein the third substrate has a third planar surface facing away from an image plane, and the third lens is bonded to the third planar surface and has a third lens surface which is a paraxial concave facing away the image plane.

11. The compound lens of claim 1, wherein the third substrate has a fourth planar surface facing an image plane, and the fourth lens is bonded to the fourth planar surface and has a fourth lens surface which is a paraxial convex facing the image plane.

12. The compound lens of claim 1, wherein the fourth substrate has a fifth planar surface facing away from an image plane, and the fifth lens is bonded to the fifth planar surface and has a fifth lens surface which is a paraxial concave facing away from the image plane.

13. The compound lens of claim 1, wherein the fourth substrate has a sixth planar surface facing an image plane, and the sixth lens is bonded to the sixth planar surface and has a sixth lens surface which is a paraxial concave facing the image plane.

14. The compound lens of claim 1, wherein the fourth substrate has a sixth planar surface facing an image plane, and the sixth lens is bonded to the sixth planar surface and has a sixth lens surface which is a paraxial convex facing the image plane.

15. The compound lens of claim 1, wherein the compound lens satisfies a following conditional expression: $1<R2/R1<8$, where R1 is a radius of a first lens surface of the first lens facing an image plane, and R2 is a radius of a second lens surface of the second lens facing away from the image plane.

16. The compound lens of claim 1, wherein the compound lens satisfies a following conditional expression: $1<R5/R4<10$, where R4 is a radius of a fourth lens surface of the fourth lens facing an image plane, and R5 is a radius of a fifth lens surface of the fifth lens facing away from the image plane.

17. The compound lens of claim 1, wherein the compound lens satisfies a following conditional expression: $TTL/IH<4$, where TTL is a total track length from a surface of the first substrate facing away from an image plane to the image plane, and IH is a half diagonal diameter of the image plane.

18. The compound lens of claim 1, wherein the compound lens satisfies a following conditional expression: $V6-V5>20$, where V5 is an Abbe number of the fifth lens, and V6 is an Abbe number of the sixth lens.

* * * * *